United States Patent
Mao et al.

(10) Patent No.: US 12,372,502 B2
(45) Date of Patent: Jul. 29, 2025

(54) METHODS FOR CHROMATOGRAPHY RESIN SLURRY DETERMINATION

(71) Applicant: Regeneron Pharmaceuticals, Inc., Tarrytown, NY (US)

(72) Inventors: Nathan Mao, Tarrytown, NY (US); Eric Shierly, Tarrytown, NY (US); Joseph Gallea, Tarrytown, NY (US); Raymond Feng, Tarrytown, NY (US); Tikiri Dissanayake, Tarrytown, NY (US); Bernhard Schilling, Tarrytown, NY (US); Scott Carver, Tarrytown, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 0 days.

(21) Appl. No.: 16/160,179

(22) Filed: Oct. 15, 2018

(65) Prior Publication Data
US 2019/0113485 A1    Apr. 18, 2019

Related U.S. Application Data

(60) Provisional application No. 62/573,393, filed on Oct. 17, 2017.

(51) Int. Cl.
*G01N 30/56* (2006.01)
*B01D 15/20* (2006.01)

(52) U.S. Cl.
CPC .......... *G01N 30/56* (2013.01); *B01D 15/206* (2013.01); *G01N 2030/565* (2013.01)

(58) Field of Classification Search
CPC . G01N 30/56; G01N 2030/565; B01D 15/206
See application file for complete search history.

(56) References Cited

U.S. PATENT DOCUMENTS

| 4,755,294 A | * | 7/1988 | Pradet | B01J 20/103 |
| | | | | 208/310 R |
| 8,088,277 B2 | * | 1/2012 | Osaheni | B01J 20/28066 |
| | | | | 208/251 R |

(Continued)

FOREIGN PATENT DOCUMENTS

| AR | 113776 A1 | 6/2020 |
| AU | 2018350886 A1 | 3/2020 |

(Continued)

OTHER PUBLICATIONS

GE Healthcare Bio-Sciences AB, Slurry Concentration Kit: Instruction 29-1125-30 AB, Jun. 2014.

(Continued)

*Primary Examiner* — Justin N Olamit
(74) *Attorney, Agent, or Firm* — McCarter & English, LLP

(57) ABSTRACT

The present invention relates to methods for determining a slurry concentration for a slurry of a chromatography resin during a column packing. The present invention provides a more accurate and consistent method for determining a slurry concentration for packing a chromatography column. The method of the present invention utilizes an automated pump to provide a controlled flow rate to consolidate a resin sample. Based on the consolidated resin, a slurry concentration can be determined. The determined slurry concentration can be utilized to pack the resin in a chromatography column with highly accurate bed heights.

19 Claims, 8 Drawing Sheets

(56) References Cited

U.S. PATENT DOCUMENTS

| | | | | |
|---|---|---|---|---|
| 8,117,901 | B2* | 2/2012 | Svensson | G01N 30/56 73/61.53 |
| 8,454,834 | B2* | 6/2013 | Karlberg | G01N 30/56 210/656 |
| 8,607,829 | B2* | 12/2013 | Williams | B01D 15/14 141/12 |
| 9,116,150 | B2* | 8/2015 | Natarajan | B01D 15/206 |
| 10,254,256 | B2* | 4/2019 | Liu | B01D 15/206 |
| 2005/0029191 | A1* | 2/2005 | Mattiasson | B01J 20/28085 210/634 |
| 2005/0167364 | A1 | 8/2005 | Hofmann | |
| 2007/0090035 | A1 | 4/2007 | Rahn et al. | |
| 2007/0199899 | A1* | 8/2007 | Alaska | B01D 15/1807 210/659 |
| 2007/0215548 | A1 | 9/2007 | Zhou | |
| 2008/0217248 | A1 | 9/2008 | Gebauer | |
| 2009/0007643 | A1 | 1/2009 | Svensson | |
| 2009/0062118 | A1 | 3/2009 | Umeda et al. | |
| 2009/0308812 | A1 | 12/2009 | Osaheni et al. | |
| 2010/0313992 | A1 | 12/2010 | Williams et al. | |
| 2011/0053127 | A1 | 3/2011 | Karlberg et al. | |
| 2014/0076459 | A1 | 3/2014 | Williams et al. | |
| 2016/0245782 | A1* | 8/2016 | Nakano | G01N 30/02 |
| 2017/0097326 | A1 | 4/2017 | Liu et al. | |

FOREIGN PATENT DOCUMENTS

| | | | |
|---|---|---|---|
| BR | 112020002443 | A2 | 7/2020 |
| CA | 3078951 | A1 | 4/2019 |
| CN | 101238366 | A | 8/2008 |
| CN | 101622044 | A | 1/2010 |
| CN | 101925813 | A | 12/2010 |
| CN | 105579843 | A | 5/2016 |
| CN | 111201072 | A | 5/2020 |
| EA | 202090777 | A1 | 7/2020 |
| IL | 273781 | | 4/2020 |
| JP | 2008-514459 | A | 5/2008 |
| JP | 2009-242770 | A | 10/2009 |
| JP | 2010-520485 | A | 6/2010 |
| JP | 2010-532470 | A | 10/2010 |
| KR | 2020-0070266 | A | 6/2020 |
| RU | 2458724 | C2 | 8/2012 |
| TW | 592785 | B | 6/2004 |
| TW | 200417405 | A | 9/2004 |
| TW | 201930875 | A | 8/2019 |
| WO | 2007/081911 | A2 | 7/2007 |
| WO | 2008/109192 | | 9/2008 |
| WO | 2009/007321 | A1 | 1/2009 |
| WO | 2009/093953 | | 7/2009 |
| WO | 2009/145715 | | 12/2009 |
| WO | 2015/053276 | A1 | 4/2015 |
| WO | 2017/008097 | A1 | 1/2017 |
| WO | 2019/079159 | A1 | 4/2019 |

OTHER PUBLICATIONS

The International Search Report and Written Opinion of the International Search Authority, mailed Jan. 29, 2019.
International Preliminary Report on Patentability received for PCT Patent Application No. PCT/US18/055827, mailed on Apr. 30, 2020, 10 pages.
International Search Report and Written Opinion received for PCT Patent Application No. PCT/US18/055827, mailed on Jan. 29, 2019, 12 pages.
Search Report received in CN201880058488.X, mailed on Apr. 25, 2021 (6 pages).
Cytiva, Tricorn Empty High Performance cols. Retrieved online at: https://cdn.cytivalifesciences.com/api/public/contet/digi-15799-pdf. 6 pages, (2020).
Japanese Office Action for Application No. 2020-508490, dated Nov. 30, 2022, 18 pages.
Brazil Office Action for Application No. BR112020002443-0, Jun. 13, 2024, 6 pages.
Brazil Office Action for Application No. BR122023012322-0, Jun. 13, 2024, 6 pages.
Eurasian Office Action for Application No. 202390600, dated Aug. 21, 2024, 11 pages.
Israel Office Action for Application No. 310934, dated Aug. 14, 2024, 4 pages.
Japanese Office Action for Application No. 2023-179943, dated Jun. 3, 2024, 10 pages.
Taiwan Office Action for Application No. 113119469, dated Oct. 21, 2024, 4 pages.
Canadian Office Action for Application No. 3,078,951, dated Jun. 9, 2025, 3 pages.

* cited by examiner

METHODS FOR CHROMATOGRAPHY RESIN SLURRY DETERMINATION

FIELD OF THE INVENTION

The present invention relates to methods for resin slurry determination for a slurry of a chromatography resin for use during a column packing. More specifically, the present invention provides a more accurate and consistent method for determining a slurry concentration for packing a chromatography column, for example by mode of axial compression.

BACKGROUND OF THE INVENTION

Resin slurry determination is a method commonly used to determine the amount of chromatography media present in aqueous-based slurries. The resin slurry percentage or slurry concentration is used in calculations during chromatography column packing operations to determine how much aqueous slurry should be put in a column to ensure proper operation and target bed heights. The slurry concentration is the major variable that must be determined and input into automatic packing columns, for example, AxiChrom® columns, to consistently pack to the correct height and packing factor. Indeed, automatic packing columns, such as AxiChrom® columns, provide packing operations that are highly automated, but rely on an accurate slurry concentration to perform reproducibly.

Current methods of resin slurry determination include gravity settling, centrifugation, and flow consolidation. The current methods obtain a representative sample from the resin slurry bulk and submit the sample to a force that induces resin settling which in turn allows for analysis of the ratio of settled resin to supernatant (the slurry concentration). However, there are several disadvantages with these methods. For instance, in the current methods, discrepancies between slurry concentration results and achieved Packing Factor (defined as the ratio of consolidated bed height to final packed bed height) and column height are often observed. In addition, centrifugation results have been shown to have high variability between different resin types and different ratios of the same standard if various wait times are employed after centrifugation. Gravity settling is considered more consistent, but can take considerable time to complete and may require a correction factor to be empirically determined and applied which increases method uncertainty.

Recently, GE Healthcare has provided a recommended consolidation method specifically for the automated packing column, AxiChrom®. This method involves obtaining a representative sample from the resin bulk, loading it into a 10 mm diameter by 100 mm Tricorn column, and manually operating a syringe to create consolidation force on the sample. After final consolidation is achieved, resin slurry is determined from the ratio of resin to supernatant. However, this method is inconsistent largely due to variation in how hard the plunger on the syringe is depressed.

Accordingly, there remains a need for a more accurate and consistent method for determining a slurry concentration for packing a chromatography column, for example, automated packing chromatography columns.

SUMMARY OF THE INVENTION

Methods are provided for determining a resin slurry percentage or slurry concentration for a slurry of a chromatography column. The methods of the present invention provide highly accurate slurry concentrations that in turn provide for accurate target bed heights when packing a resin in a chromatography column, for example, in an automated packing column.

In one embodiment, the present invention provides for a method of determining a slurry concentration, including adding a slurry comprising a resin to a first chromatography column; pumping a volume of liquid, for example, deionized water, distilled water, purified water, a saline solution, or an organic solvent, through the chromatography column at a constant flow rate to form a consolidated resin, where the volume of liquid is pumped through the chromatography column by an automated pump system; upon completion of the pumping step, measuring a bed height of the consolidated resin; and determining a slurry concentration from the measured bed height. In some embodiments, the method may further include a step of adding water to the chromatography column and allowing the slurry to settle for about five minutes to about one hour prior to pumping. In other embodiments, the method may further include utilizing the determined slurry concentration to pack a second chromatography column. In this aspect, the second chromatography column includes a consolidation rate and the flow rate is equivalent to the consolidation rate. In still another embodiment, the automated pump system may include a syringe operatively coupled to a pump. In some embodiments the pump system is programed to cycle on and off for a predetermined period of time or for multiple periods of time.

In another embodiment, the present invention provides a method for determining a slurry concentration for a slurry of a chromatography resin during a column packing, including adding a slurry including a resin to a chromatography column; setting an automated pump to run at a constant flow rate for a period of time, for example, beginning at the start of pumping and ending when the resin is settled; pumping a volume of liquid through the chromatography column at the constant flow rate to form a consolidated resin, where the volume of liquid is pumped through the chromatography column by the automated pump; upon completion of the pumping step, measuring a bed height of the consolidated resin; and determining a slurry concentration from the measured bed height. In some embodiments, the method may include a step for providing a flow rate based on the type of resin utilized in the slurry. The flow rate may range from about 20 cm/hr to about 1500 cm/hr. In other embodiments, the method may include a step for mixing the slurry prior to adding the slurry to the chromatography column. In still other embodiments, the method may include a step for utilizing the determined slurry concentration to pack the resin in a second chromatography column, where the second chromatography column includes a consolidation rate and the flow rate is equivalent to the consolidation rate. In yet another embodiment, the liquid may be deionized water, distilled water, purified water, a saline solution, or an organic solvent.

In yet another embodiment, the present invention includes a method for determining a slurry concentration for a slurry of a chromatography resin during a column packing, including providing a slurry including a resin; mixing the slurry to uniformly distribute the resin; adding the slurry to a chromatography column; providing an automated syringe pump system comprising a pump having a controller and a syringe operatively coupled to the pump, wherein the automated syringe pump system is configured to pump a volume of water through the chromatography column and the controller is configured to control a flow rate of the volume of water such that the flow rate is constant for a period of time; pumping the volume of water through the chromatography column at the constant flow rate to form a consolidated resin; upon completion of the pumping step, measuring a bed height of the consolidated resin; determining a slurry concentration from the measured bed height; inputting the determined slurry concentration into a second chromatography column; and utilizing the determined slurry concentration to pack the resin in the second chromatography column. In some embodiments, the flow rate ranges from about 30 cm/hr to about 60 cm/hr. In another embodiment, the second chromatography column includes a consolidation rate and the flow rate is equivalent to the consolidation rate. In other embodiments, the second chromatography column includes a consolidation rate and the flow rate is different from the consolidation rate. In still other embodiments, the packed second chromatography column has a bed height within 1 cm of a target bed height.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The present invention relates to methods for determining a resin slurry percentage or slurry concentration for a slurry of a chromatography column. More specifically, the present invention utilizes an automated pump system to provide a controlled flow rate to consolidate a resin sample. Based on the consolidated resin sample, a slurry concentration can be determined and utilized to pack the same resin in a second chromatography column. It has been discovered that, by controlling the delivery flow rate to match the consolidation rate employed by the chromatography column that will pack the resin, a highly reproducible slurry concentration is achieved that corresponds to the slurry concentration required for accurate packing of the second chromatography column without the need for correction factors.

The present invention provides numerous advantages over the traditional slurry determination methods including centrifugation, gravity settling, and manual syringe methods. The methods and systems of the present invention can be assembled, performed, and disassembled within a shorter time period than any of the traditional slurry determination methods. In addition, the methods of the present invention have been shown to generate more consistent and reproducible slurry concentration results with lower standard deviations between replicated measurements than results from the traditional slurry determination methods.

Figure 1:
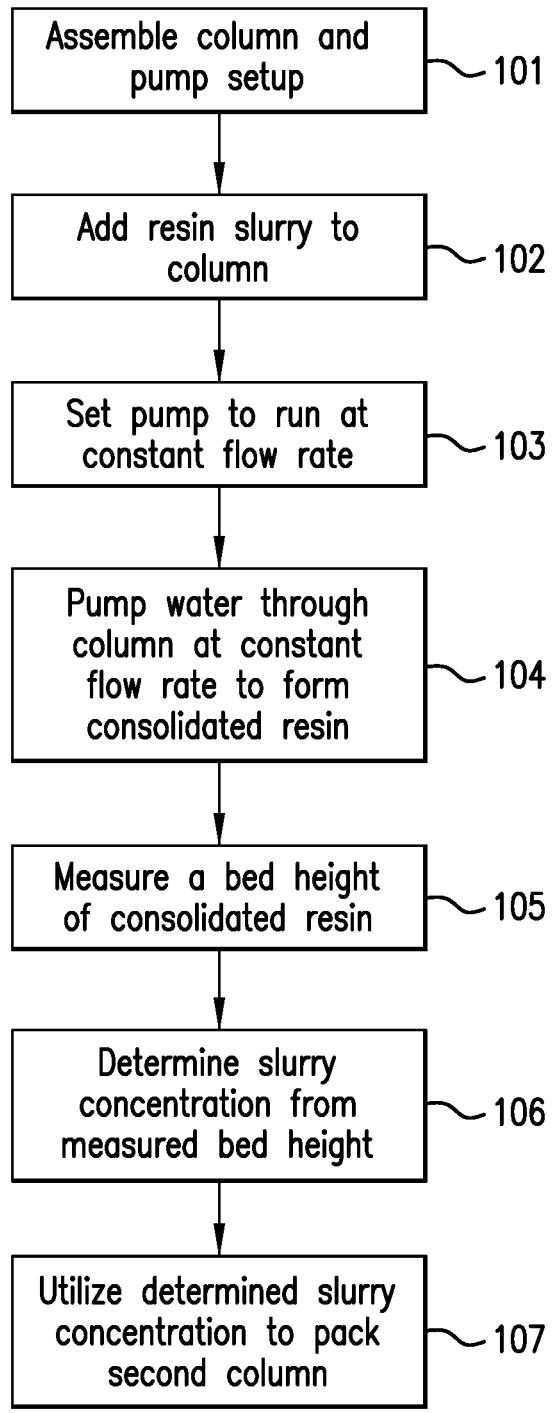
FIG. 1 is a flow chart of a method for resin slurry determination in accordance with the present invention.
Figure 2A:
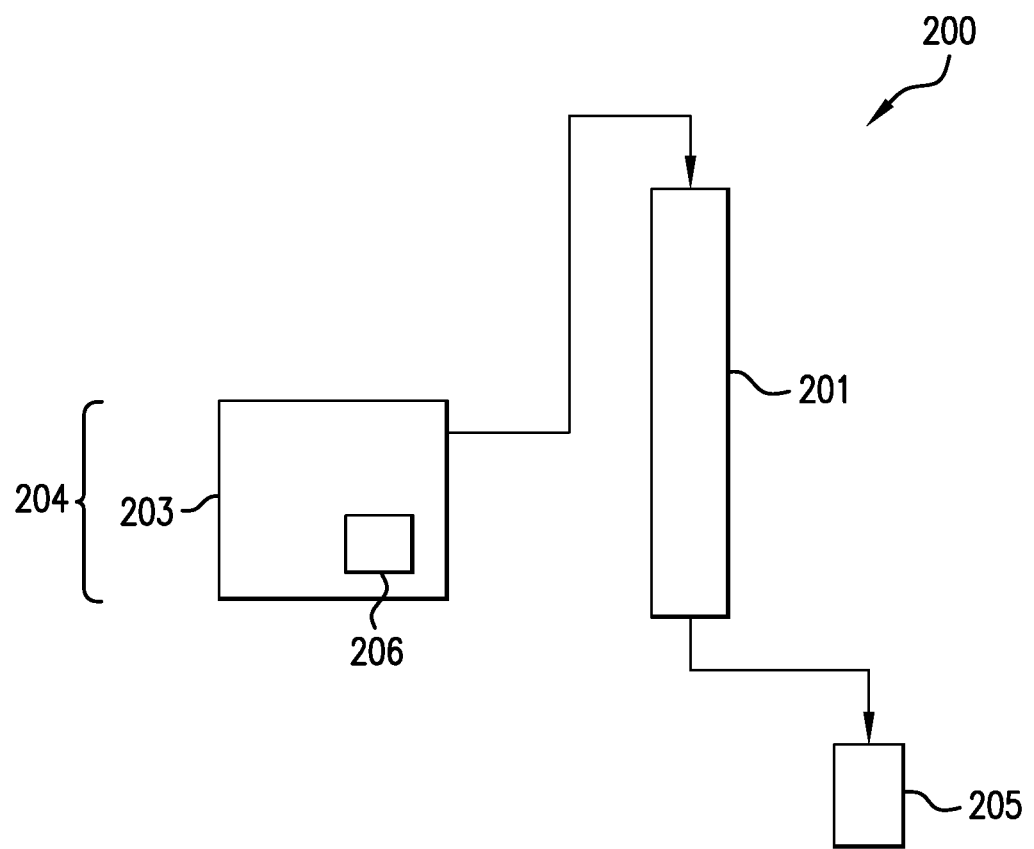
FIGS. 2A and 2B are schematic diagrams of systems for resin slurry determination associated with FIG. 1 in accordance with the present invention.
Figure 2B:
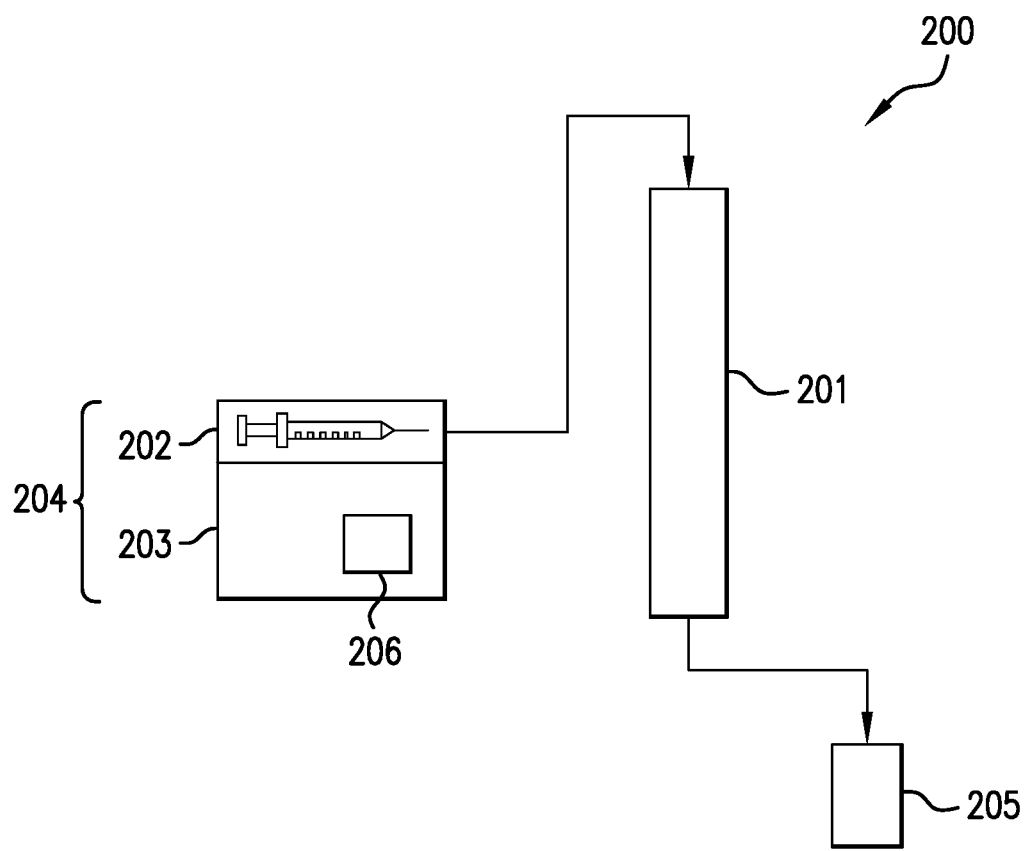

FIG. 1 shows a flow chart of a method for resin slurry determination according to one embodiment of the present invention. At step 101, the setup of the column and pump is assembled. FIGS. 2A and 2B show various setups of systems for determining a resin slurry percentage in accordance with the present invention. As shown in FIG. 2A, the system 200 includes a column 201, an automated pump system 204 including a pump 203 having a controller 206, and a flow through collection container 205. The pump 203 provides the flow of liquid to the column 201. In this aspect, the column 201 is vertically oriented and the pump 203 is operatively connected to a top portion of the column 201 such that the liquid flows from the pump 203 into the column 201. The flow of liquid is provided through the use of the automated pump 203. Pump 203 includes a controller 206 that is operable to start and stop the pump 203 and define a flow rate of the liquid leaving the pump 203. The system of the present invention also includes a flow through collection container 205 operatively connected to a bottom portion of the column 201. The flow through collection container 205 is designed to collect liquid that flows through the column 201.

In another embodiment, as shown in FIG. 2B, the automated pump system 204 may further include a syringe 202 operatively coupled to the pump 203. The syringe 202 may provide the flow of liquid to the column 201 through the use of the automated pump 203. In one embodiment, the controller 206 of the pump 203 is operable to define the flow rate of the liquid leaving the syringe 202. In this aspect, the column 201 is vertically oriented and the syringe 202 is operatively connected to a top portion of the column 201 such that the liquid flows from the syringe 202 into the column 201.

The column 201 may be operatively connected to the pump 203 or syringe 202 and flow through collection container 205 by any connection means that allows for liquid to flow from the pump 203 or syringe 202 into the column 201 and outward from the column 201 to the flow through collection container 205. For example, the column 201 may be operatively connected to the pump 203 or syringe 202 and flow through collection container 205 by tubing. In this aspect, a piece of tubing may connect the pump 203 or syringe 202 to the top of the column 201 and a separate piece of tubing may connect the bottom of the column 201 to the flow through collection container 205.

The type and size of the column 201 may vary. In one embodiment, the column 201 is a chromatography column. In another embodiment, the column 201 is an analytical scale chromatography column. For example, the column 201 may be a 1 cm×25 cm chromatography column. Analytical scale chromatography columns are advantageous for use with the present invention because such columns are small, easily transportable and provide sufficient vertical resolution to perform exact slurry ratio readings.

The type and size of the pump system 204 may also vary so long as the pump 203 is capable of providing a constant flow rate of liquid to the column 201. In one embodiment, the pump 203 may include any automated or mechanical pump that delivers accurate flow from 0.2 mL/min. For example, the pump 203 may include any type of auto injector having a fully automated system. In another embodiment, as described above, the pump 203 may include a syringe 202 that provides the flow of liquid to the column 201. In this aspect, the syringe 202 should have a volume of at least 20 mL. In another embodiment, the syringe 202 may have a volume of at least 30 mL. In still another embodiment, the syringe 202 may have a volume of 20 mL to 60 mL. The flow through collection container 205 may be any container operable to receive flow through from the column 201. Suitable flow through collection containers 205 include, but are not limited to, beakers, flasks, graduated cylinders, test tubes, bottles, and jars.

After assembly of the system 200, a slurry including a resin is added to the column 201 (step 102). Any resin suitable for use in a chromatography column is contemplated by the present invention. In some embodiments, the present invention contemplates the use of resins suitable for protein purification. Examples of resins contemplated by the present invention include, but are not limited to, rProtein A Sepharose® Fast Flow, MabSelect™ Xtra, MabSelect SuRe™, Capto™ Phenyl, Q Sepharose® Fast Flow, Phenyl Sepharose® HP, POROS® 50 HS, Fractogel® EMD Hicap SE, Capto™ Q, and Superdex® 200 HR.

The resin should be thoroughly mixed in the slurry such that the resin is uniformly distributed before addition to the column 201. The mixed resin slurry may be added to the column 201 using any technique known in the art. In one embodiment, the resin slurry may be pipetted into the column 201, for example, with the use of a pipette controller. The amount of resin slurry to be added will depend upon on the desired settled resin bed volume. In one embodiment, the slurry may be added to the column 201 until the meniscus is at a height of about 23 cm to about 25 cm. For example, the slurry may be added to the column 201 until the meniscus is at a height of about 25 cm. In this aspect, increased accuracy is achieved when a greater amount of the available space within the column is utilized. Upon adding the slurry to the column, the final height of the slurry should be determined and recorded for later use. After the resin slurry is added to the column 201 and the height of the resin slurry is determined, purified water may be added to the column 201 until the water is near the top of the column 201. This allows for the installation of a top adapter or piston on the column 201 and expulsion of air, which is important for laminar flow. The resin slurry may then be allowed to settle for a duration of time. In one embodiment, the slurry may be allowed to settle for about five minutes to about one hour. In another embodiment, the slurry may be allowed to settle for about 20 minutes to about 45 minutes. For example, the slurry may be allowed to settle for about 30 minutes.

At step 103, the pump system 204 is set to provide a flow of liquid at a constant flow rate. In this aspect, the controller 206 of the pump 203 may be set to define a flow rate of the liquid flowing out from the pump 203. The flow rate of the liquid is selected based upon the specific resin utilized in the slurry (for example, its physical characteristics such as bead size, bead base matrix, and base matrix density) and the consolidation rate employed by a second column, for example, an automated packing column, that will pack the utilized resin for chromatography operations. In one embodiment, the flow rate of the liquid may be selected such that the flow rate is equivalent to the consolidation rate of the second column, for example, the automated packing column. Indeed, by controlling the flow rate of the liquid to match the consolidation rate employed by the column that will perform the packing of the resin, a highly reproducible slurry concentration may be achieved that corresponds to the slurry concentration required for accurate packing in the second column without the need for correction factors. However, highly reproducible slurry concentrations may still be achieved when the flow rate of the liquid is not the same as the consolidation rate. Thus, in some embodiments, the flow rate of the liquid may not be equivalent to the consolidation rate of the second column.

The flow rate of the liquid may vary based on the column, the resin, and the technology of packing utilized. In one embodiment, the flow rate of the liquid may range from about 20 cm/hr to about 1500 cm/hr. In another embodiment, the flow rate of the liquid may range from about 30 cm/hr to about 1000 cm/hr. In still another embodiment, the flow rate of the liquid may range from about 50 cm/hr to about 600 cm/hr. In yet another embodiment, the flow rate of the liquid may range from about 60 cm/hr to about 200 cm/hr. In some embodiments, the flow rate of the liquid may be about 30 cm/hr. In other embodiments, the flow rate of the liquid may be about 60 cm/hr.

At step 104, the pump system 204 is started such that the flow of liquid is pumped from the pump 203 to and through the column 201. In one embodiment, the liquid that is pumped through the column 201 is water. For example, the water may be distilled, deionized, and/or purified. In another embodiment, the liquid that is pumped through the column 201 may be a saline solution. In still another embodiment, the liquid that is pumped through the column 201 may be any organic solvent. For example, the liquid may be an alcohol. Suitable alcohols include, but are not limited to, ethanol, propanol, butanol, pentanol, hexanol, heptanol, and octanol. In this aspect, to provide for more universal and consistent results, the liquid that is pumped through the column 201 should be the same liquid used during manufacturing packing operations for the selected resin.

The controller 206 of the pump 203 may be used to start the automated flow of the liquid from the pump 203 to the column 201. As discussed above, the flow of liquid is pumped from the pump 203 to and through the column 201 at a selected flow rate that remains constant throughout step 104. The pumping of the flow of liquid should continue until the resin stops settling. In one embodiment, the liquid may be pumped through the column 201 for a time period of about 10 minutes to about 50 minutes. In another embodiment, the liquid may be pumped through the column 201 for a time period of about 15 minutes to about 40 minutes. In still another embodiment, the liquid may be pumped through the column 201 for a time period of about 15 minutes to about 30 minutes. For instance, in some embodiments, when the flow rate of the liquid is about 30 cm/hr, the liquid may be pumped through the column 201 for about 30 minutes. In other embodiments, when the flow rate of the liquid is about 60 cm/hr, the liquid may be pumped through the column 201 for about 15 minutes. In some embodiments, the flow rate is stopped or paused for one or more periods of time. For example the flow rate can be paused for 1 to 5 minutes, 5 to 10 minutes, 10 to 20 minutes, 20 to 30 minutes, 40 to 50 minutes or one or more hours. The flow rate can be restarted after each pause. In some embodiment stopping flow of liquid is not necessary for achieve accurate reading. For example the systems can be in a state of continuous consolidation flow for greater than 1 hour. This is an additional benefit of automated flow and not possible with the GE kit. The controller 206 may be used to stop the automated flow of the liquid from the pump 203 to the column 201.

In one embodiment the method includes the automated pump is programed to stop the flow of liquid through the chromatography column and allow the resin to settle, and then restarting the pump to flow liquid through the chromatography column before completion of the pumping step. The pumping can be paused for more than one time period. In one embodiment, the pumping is paused for a time period of 1 to 60 minutes. In some embodiments the pump is program to pump intermittently. In one embodiment, for all 60 cm/hr consolidation rate resins the cycle is 15 min flow>5 min pause>5 min additional flow. 30 cm/hr consolidations would require doubling of the flow durations. In some embodiments, result readings would be taken immediately before or after end of final flow operation After the flow of liquid is stopped, the bed of resin may be allowed to stabilize for a duration of time without flow. In one embodiment, after the flow of liquid is stopped, the bed of resin may be allowed to stabilize for about 10 minutes to about 45 minutes. For example, the bed of resin may be allowed to stabilize for about 30 minutes. In another embodiment, after the flow of liquid is paused, the bed of resin can be allowed to stabilize for 5 to 10 minutes before restarting the syringe pump system 204 at the same flow rate for an additional 5 minutes. In this aspect, performing sequential flow consolidations can minimize variability. At step 105, the height of the bed of settled/consolidated resin may be measured. The measurement step may be carried out with any measuring device that allows for an accurate reading of the height of the bed. In some embodiments, the column 201 may include a ruler vertically positioned on an outer surface. Upon measuring the bed height of the consolidated resin, the slurry concentration may be determined from the measured bed height (step 106). The measured slurry concentration in percent is given directly by the bed height in centimeters.

After determination of the slurry concentration for the utilized resin, the slurry concentration may be used to pack a second column. The second column may be any chromatography column including automated packing columns. For example, the automated packing column may be an AxiChrom® column. In this aspect, the slurry concentration may be input into an automated packing column. In some embodiments, an operator may manually input the determined slurry concentration into the packing column. In other embodiments, the determined slurry concentration may be automatically entered into the packing column through the use of a network or hardware circuitry connecting the system 200 to the automated packing column. Regardless of the type of column utilized to pack the resin, the determined slurry concentration is highly reproducible and corresponds to the slurry concentration required to accurately pack the second column.

The methods of the present invention provide highly accurate slurry concentrations that in turn provide for accurate target bed heights when packing the resin in a chromatography column. In one embodiment, column packing that utilizes the slurry concentrations determined in accordance with the present invention achieves bed heights within 2 cm of the target bed height. In another embodiment, column packing that utilizes the slurry concentrations determined in accordance with the present invention achieves bed heights within 1 cm of the target bed height. In still another embodiment, column packing that utilizes the slurry concentrations determined in accordance with the present invention achieves bed heights within 0.75 cm of the target bed height. In yet another embodiment, column packing that utilizes the slurry concentrations determined in accordance with the present invention achieves bed heights within 0.50 cm of the target bed height. For example, column packing that utilizes the slurry concentrations determined in accordance with the present invention achieves bed heights within 0.10 cm of the target bed height.

In addition, column packing that utilizes the slurry concentrations determined in accordance with the present invention achieve highly accurate packing factors when packing the resin in a chromatography column. For instance, column packing that utilizes the slurry concentrations determined in accordance with the present invention achieve packing factors within 5% of ideal packing factors. In still another embodiment, column packing that utilizes the slurry concentrations determined in accordance with the present invention achieve packing factors within 3% of ideal packing factors.

EXAMPLES

The following non-limiting examples demonstrate methods of determining a slurry concentration in accordance with the present invention. The examples are merely illustrative of the preferred embodiments of the present invention, and are not to be construed as limiting the invention, the scope of which is defined by the appended claims.

Inventive Example 1

A method for determining a slurry concentration was performed in accordance with the present invention. The method was performed with a 1 cm×25 cm chromatography SNAP column. A KD Scientific syringe pump was used to provide a controlled flow rate to consolidate a resin sample. The following resins were tested: MabSelect SuRe™, POROS® 50 HQ, and Capto™ Phenyl.

Table 1 shows the results of the method carried out in accordance with the present invention.

TABLE 1

INVENTIVE METHOD RESULTS

|  | MabSelect SuRe | POROS 50 | Capto Phenyl |
|---|---|---|---|
| Consolidation Run 1 Slurry % | 55.1 | 60.6 | 57.0 |
| Consolidation Run 2 Slurry % | 55.4 | 59.9 | 56.8 |
| Consolidation Run 3 Slurry % | 54.9 | 59.5 | 56.9 |
| Consolidation Run Average Slurry % | 55.2 | 60.0 | 56.9 |
| Target Bed Height (cm) | 20.0 | 20.0 | 20.0 |
| Target Packing Factor | 1.15 | 1.06 | 1.10 |
| Achieved Column Results |  |  |  |
| Bed Height (cm) | 19.86 | 19.67 | 19.58 |
| Packing Factor Run 1 | 1.15 | 1.06 | 1.10 |
| Bed Height (cm) | 19.75 | 19.89 | 19.64 |
| Packing Factor Run 2 | 1.15 | 1.06 | 1.10 |
| Bed Height (cm) | 19.93 | 20.04 | 19.60 |
| Packing Factor Run 3 | 1.15 | 1.06 | 1.10 |
| Bed Height (cm) | 19.84 | 19.86 | 19.60 |
| Packing Factor Average | 1.15 | 1.06 | 1.10 |
| Standard Deviation for Consolidation Runs (cm) | 0.2 | 0.6 | 0.1 |

As can be seen from the data in Table 1, the methods of the present invention demonstrate consistent and reproducible results with low standard deviations between replicated measurements. The slurry concentrations obtained according to the present invention resulted in average bed heights that differed from the target bed height by 0.4 cm or less. The low standard deviations show that results are highly reproducible.

Comparative Example 2

Centrifugation

An Allegra® 6KR centrifuge with 13 mL centrifuge tubes was utilized. The slurry was adjusted to 50% ratio by removing supernatant before centrifugation. Centrifugation of 10 mL of slurry sample was performed at 1000 rpm for 5 minutes and 3500 rpm for 15 minutes. Table 2, depicted below, shows the resins that were used.

TABLE 2

TESTED RESINS

| Resin | Particle Size d50 (μm) | Base Matrix |
|---|---|---|
| rProtein A Sepharose ® Fast Flow* | 90 | 4% cross-linked agarose |
| MabSelect ™ Xtra | 75 | Highly cross-linked agarose |
| Mab Select SuRe ™ | 85 | Highly cross-linked agarose |
| Capto ™ Phenyl | 75 | Highly cross-linked agarose |
| Q Sepharose ® Fast Flow | 90 | 6% cross-linked agarose |
| Phenyl Sepharose ® HP* | 34 | 6% cross-linked agarose |
| POROS ® 50 HS | 50 | Cross-linked poly(styrenedivinylbenzene) |
| Fractogel ® EMD Hicap SE | 48-60 | Uniform spherical particles, no agglomerates, no fines |
| Capto ™ Q | 90 | Highly cross-linked agarose with dextran surface extender |
| Superdex ® 200 HR | 13 | Composite of cross-linked agarose and dextran |

*Resins failed to consolidate properly.

Figure 3:
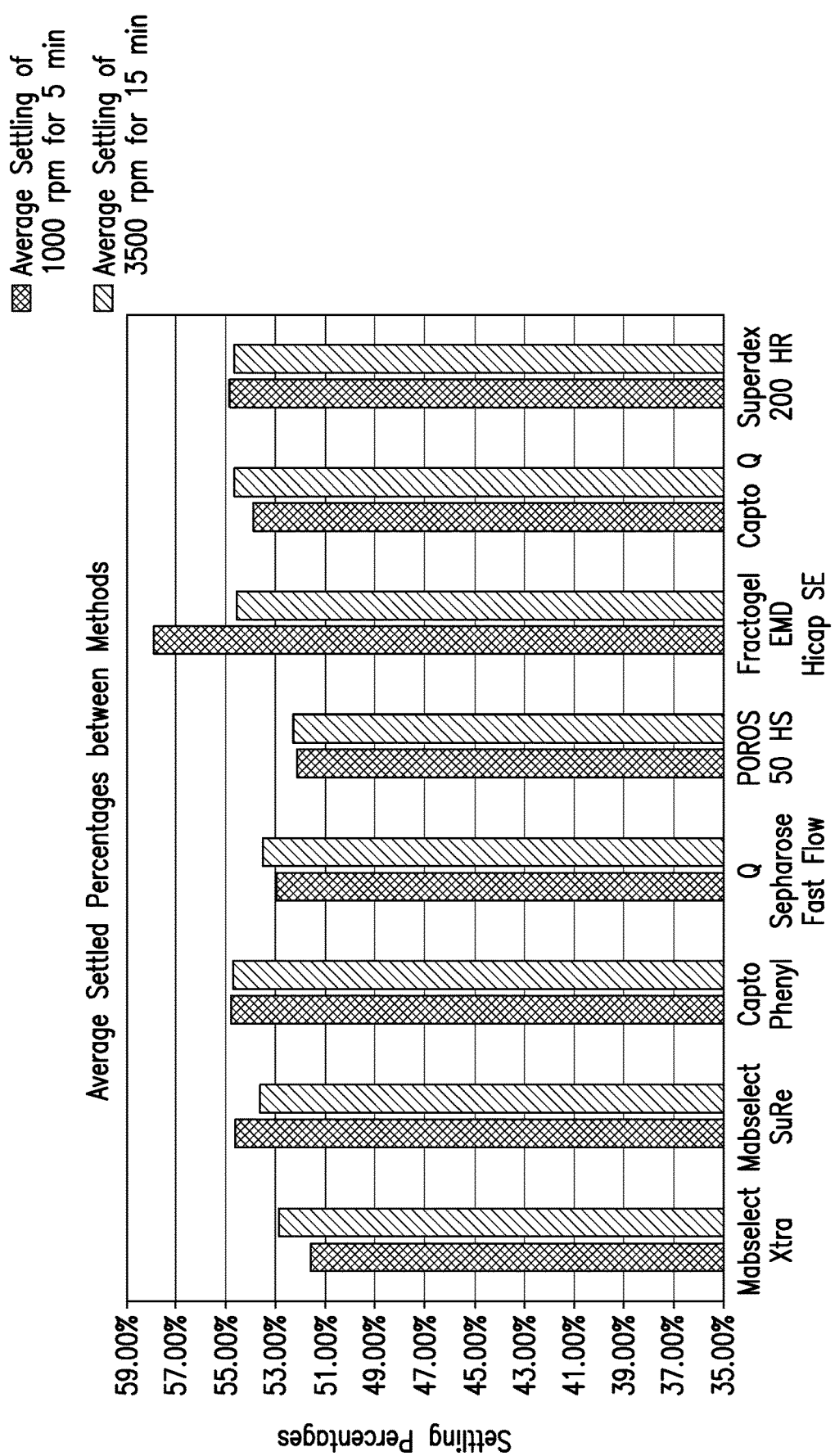
FIG. 3 is a bar graph showing the average settled percentages of resins after centrifugation.

FIG. 3 demonstrates the results of the centrifugation methods. More particularly, FIG. 3 shows the average settled percentages for centrifugation at 1000 rpm for 5 minutes and 3500 rpm for 15 minutes. As can be seen from FIG. 3, centrifugation results were variable between resins and consistently overestimated the volume of resin which was known to be 50%. This shows that centrifugation is not a sufficient settling method.

Flow Consolidation

An AKTA Avant chromatography system (with 2.5 cm×50 cm chromatography SNAP columns) was used to simulate consolidation effects of AxiChrom® technology. All resins were consolidated at 60 cm/hr. The resins shown in Table 2 were also utilized for the flow consolidation tests. The resins were gravity settled overnight. The slurry was adjusted to 50% ratio by removing supernatant before conducting flow consolidation.

Table 3, depicted below, shows the average flow consolidation results between run 1 and run 2.

TABLE 3

AVERAGE FLOW CONSOLIDATION RESULTS

|  | MabSelect ™ Xtra | MabSelect SuRe ™ | Capto ™ Phenyl | Q Sepharose ® Fast Flow | POROS ® 50 HS | Fractogel ® EMD Hicap SE | Capto ™ Q | Superdex ® 200 Prep Grade |
|---|---|---|---|---|---|---|---|---|
| Average | 51.71% | 52.66% | 55.07% | 45.85% | 49.10% | 51.60% | 47.59% | 51.10% |

As can be seen from Table 3, consolidation results were variable between resins and none consolidated back to the original 50% ratio. This shows that gravity is not a sufficient settling method.

Comparison of Results of Centrifugation and Consolidation Methods

Table 4, depicted below, compares the results of each of the centrifugation and flow consolidation methods.

TABLE 4

CENTRIFUGATION AND CONSOLIDATION RESULTS COMPARISON

| | Average Consolidation | Initial Centrifugation (T = 0) | Difference between Consolidation and Initial Centrifugation Readings | Settled Centrifugation Reading (T = 2 hrs) | Difference between Consolidation and Settled Centrifugation Readings (T = 2 hrs) |
|---|---|---|---|---|---|
| MabSelect ™ Xtra | 51.71% | 58.27% | 6.56% | 57.02% | 5.31% |
| MabSelect SuRe ™ | 52.66% | 57.84% | 5.18% | 54.39% | 1.73% |
| Capto ™ Phenyl | 55.07% | 59.12% | 4.05% | 54.72% | 0.35% |
| Q Sepharose ® Fast Flow | 45.85% | 53.69% | 7.84% | 53.43% | 7.58% |
| POROS ® 50 HS | 49.10% | 54.12% | 5.02% | 52.86% | 3.76% |
| Fractogel ® EMD Hicap SE | 51.60% | 55.43% | 3.83% | 52.99% | 1.39% |
| Capto ™ Q | 47.59% | 55.97% | 8.38% | 54.62% | 7.03% |
| Superdex ® 200 Prep Grade | 51.10% | 56.27% | 5.17% | 55.65% | 4.55% |

As can be seen from the above table, the consolidation and centrifugation results widely differ. Six out of the eight resins had a difference greater than 5% between consolidation and initial centrifugation readings. This difference did not resolve even after given an extended duration of 2 hours. Indeed, after 2 hours, three out of the eight resins still had a difference greater than 5% between consolidation and settled centrifugation readings. This shows consolidation and centrifugation were not sufficient for slurry concentration determination due to testing variability, long settling times, and resin to resin variation.

Additionally, several of the readings did not achieve target packing factors. For purposes of calculating target packing factors, 5% of 20 cm (the target bed height) is 1 cm, which is the maximum allowable bed height range. A difference of greater than 5% means the reading did not achieve the target packing factor. As can been seen from the above data, several of the readings did not achieve target packing factors.

Comparative Example 3

Table 5, depicted below, shows a comparison of centrifugation slurry percent and final bed height between the centrifugation method and GE Kit.

TABLE 5

CENTRIFUGATION AND GE KIT RESULTS COMPARISON

| | mAb1 Trap Packs | | |
|---|---|---|---|
| | CEX | AEX | ProA |
| Manufacturing Centrifugation Slurry % | 72.7 | 52.6 | 51.9 |
| Manufacturing Final Bed Height (cm) | 29.1 | 17 | 14.8 |
| GE Kit Slurry % | 73 | 49 | 52.7 |

TABLE 5-continued

CENTRIFUGATION AND GE KIT RESULTS COMPARISON

| | mAb1 Trap Packs | | |
|---|---|---|---|
| | CEX | AEX | ProA |
| GE Kit Theoretical Final Height (cm) | 28.7 | 18.1 | 14.6 |
| Correct Resin Slurry % | 69.91 | 49.25 | 51.21 |
| Target Bed Height (cm) | 30 | 18 | 15 |
| Difference between Manufacturing and Correct Slurry % | 2.79 | 3.35 | 0.69 |
| Difference between GE Kit and Correct Slurry % | 3.09 | 0.25 | 1.49 |
| Difference between Manufacturing and Target Bed Height (cm) | 0.9 | 1 | 0.2 |
| Difference between GE Kit and Target Bed Height (cm) | 1.27 | 0.09 | 0.42 |

As can be seen in Table 5, both the centrifugation method and the GE Kit failed to reach the target bed height in several of the resin types tested indicating that the methods are inconsistent.

Figure 4:
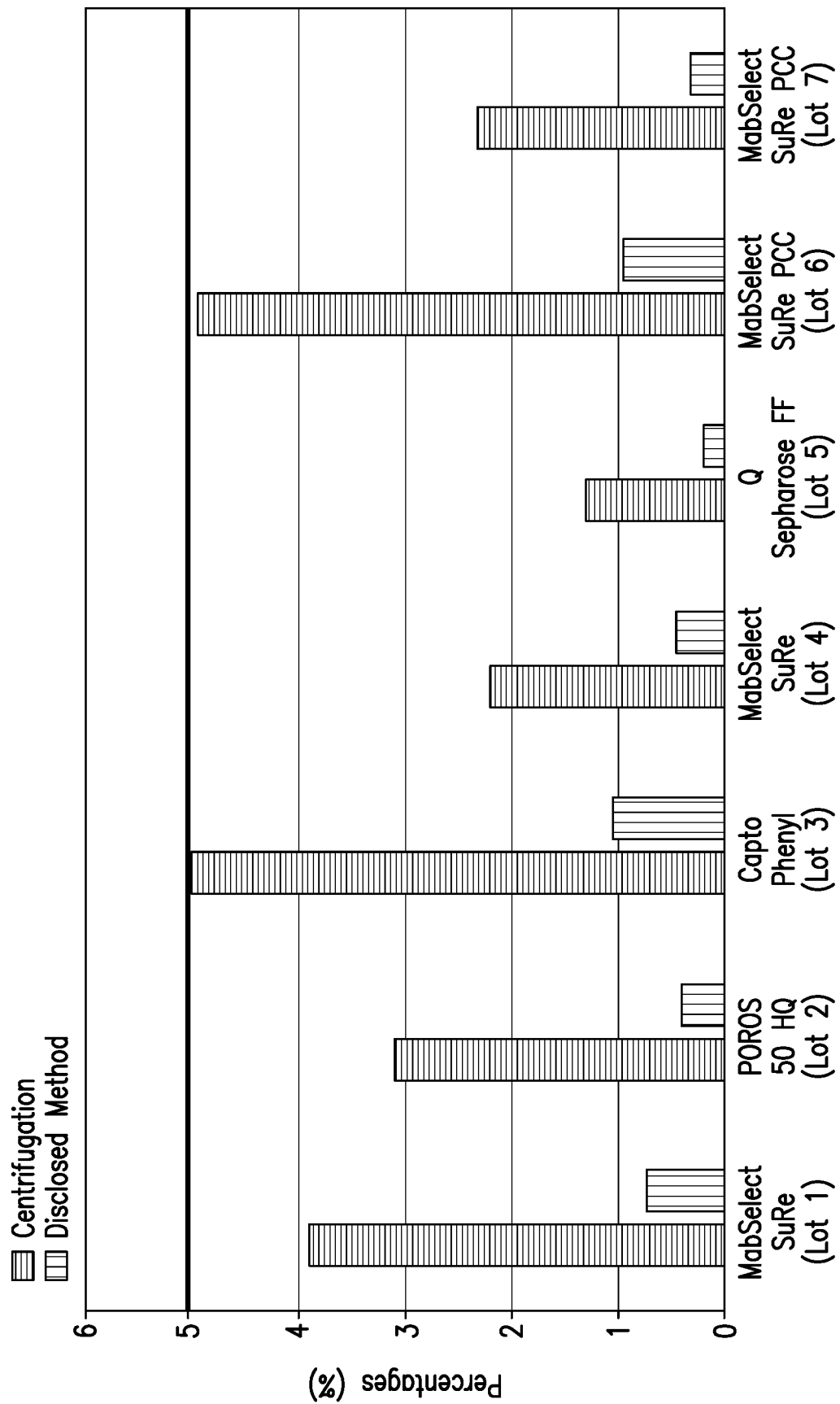
FIG. 4 is a bar graph showing the percent error for resin slurry determination for centrifugation (shaded bar) and the currently claimed process (stiple bar) for various types of resin.

Comparison of Results of Centrifugation, GE Kit, and Methods According to Present Disclosure FIG. 4 compares the percent error in slurry concentration for the centrifugation method and the methods according to the present disclosure. Several different types of resin were tested, including MabSelect SuRe, POROS 50 HQ, Capto Phenyl, Q Sepharose FF, and MabSelect SuRe PCC. For all of the resin types, the methods according to the present disclosure showed significant reduction in error when compared to centrifugation methods. Additionally, for several of the resin types tested, the centrifugation method had error percentages reaching the error limit of 5% which indicates the pack compromised ideal packing factor to achieve the minimum height requirement to allow for use. Compromised packing factor can lead to column deterioration and reduced amount of column reuse. In some embodiment, columns have to meet final desired metrics including a desired height and packing factor. As the column consolidates, the height goes down and the packing factor goes up. In one embodiment, the columns achieve a height of 19-21 cm and target the compression.

Figure 5:
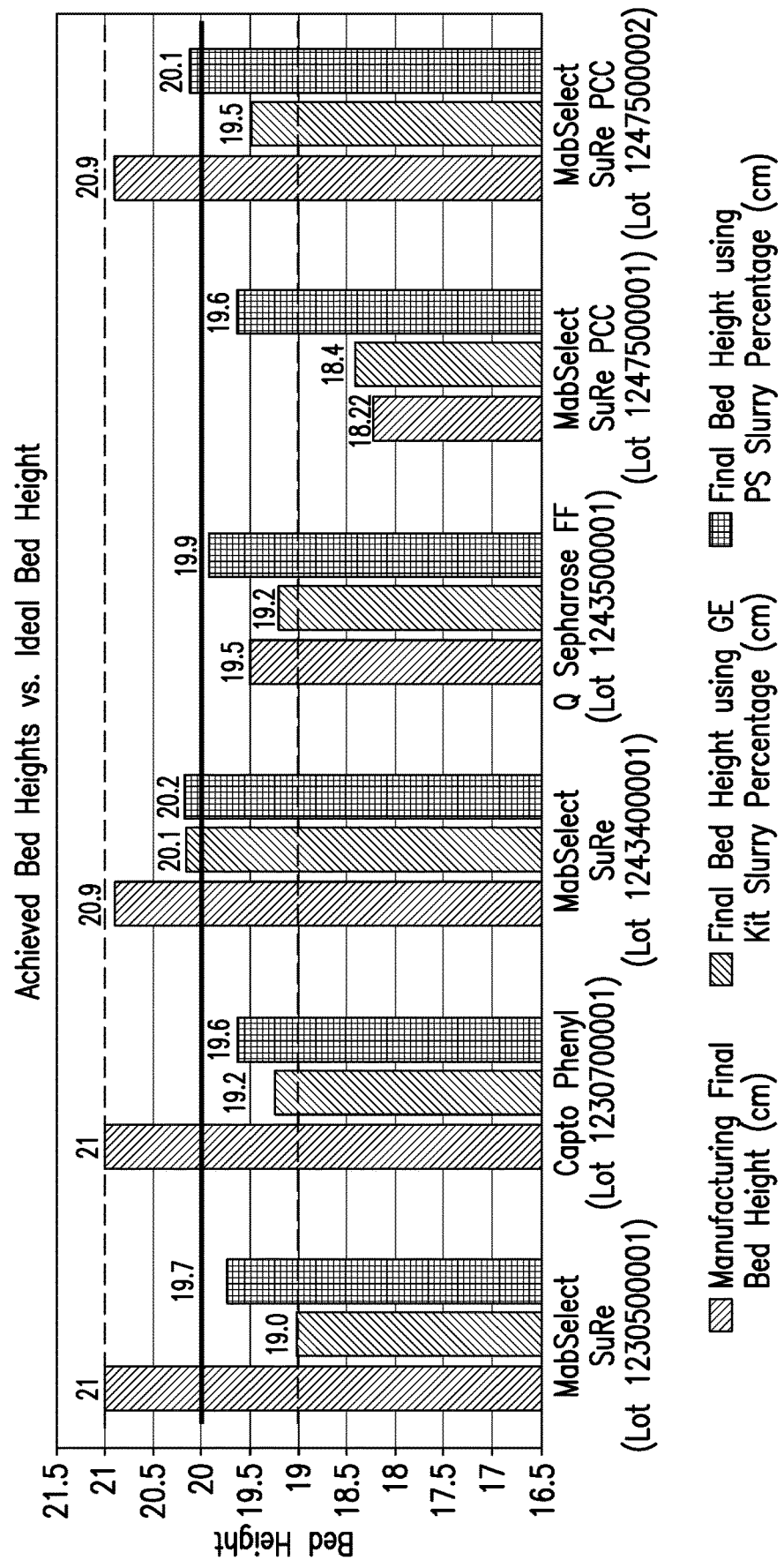
FIG. 5 is a bar graph showing achieved bed height versus ideal bed height obtained using centrifugation, GE Slurry Kit, or the method in accordance with the present invention. In each set of three bars the first bar represents centrifugation, the middle bar represents the GE Slurry Kit, and the last of the three bars represents the results using the disclosed method for various types of resin. The solid horizontal line represents the target bed height of the individual resin packs. The dashed horizontal lines represents the bed height limit (±1 cm) before the pack is outside the acceptable bed height range. The X axis represents the type of resin slurry and the Y axis represents the bed height (cm).
Figure 6:
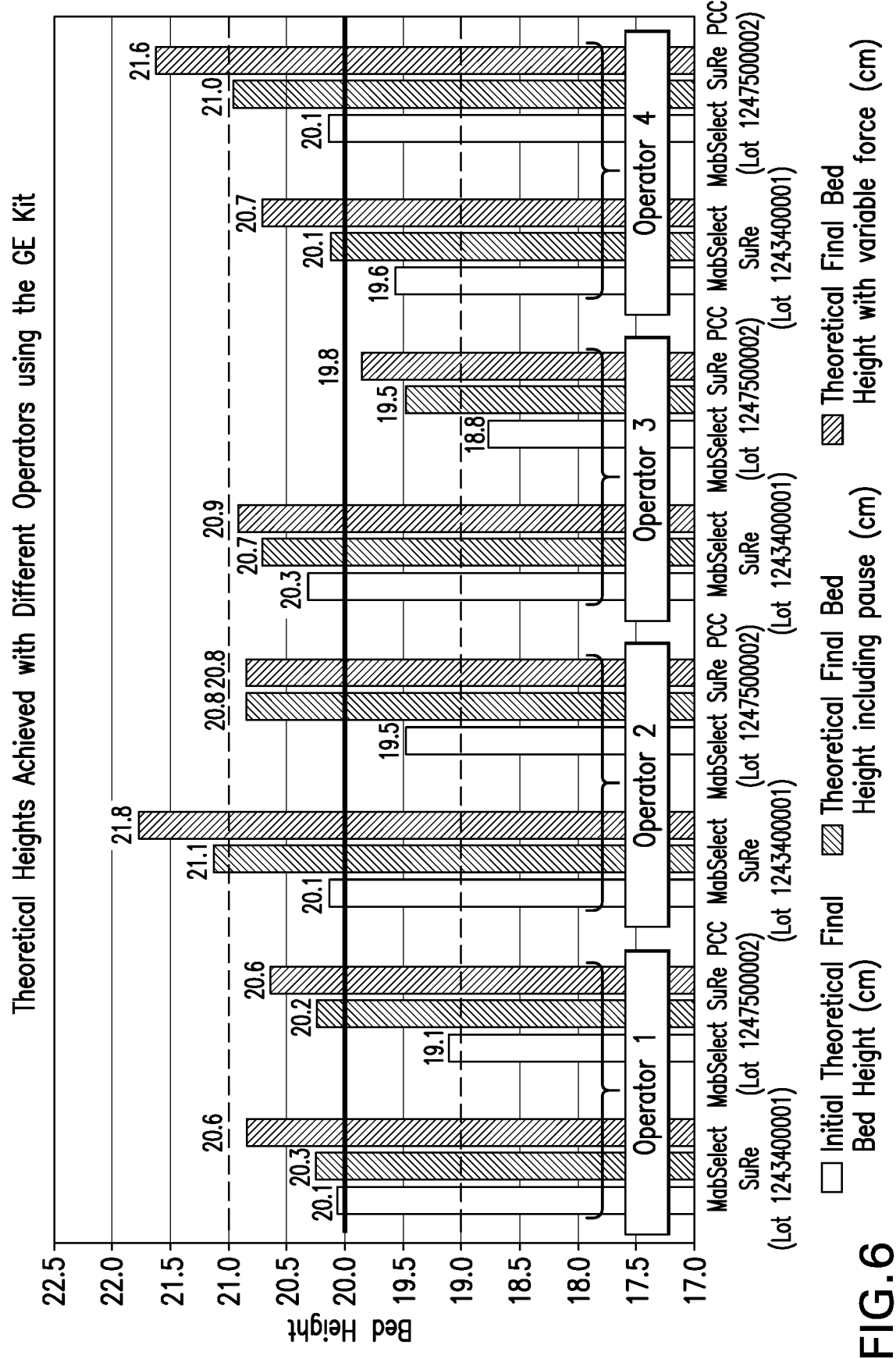
FIG. 6 is a bar graph showing theoretical bed heights achieved with different operators using the GE kit for various resin types. In each set of three bars the first bar represents centrifugation, the middle bar represents the GE Slurry Kit, and the last of the three bars represents the results using the disclosed method for various types of resin. The in each set of three bars, the first bar represents initial theoretical final bed height, the middle bar represents theoretical final bed height including pause, and the last bar represents theoretical final bed height with variable force. The solid horizontal line represents the ideal bed height of the individual resin packs. The dashed horizontal lines represent the bed height limit (±1 cm) before the pack is outside the acceptable bed height range. The X axis represents the type of resin slurry and the Y axis represents the bed height (cm).

FIG. 5 shows a direct comparison of the bed heights achieved using the centrifugation method, the GE Kit, and the method according to the current disclosure. As demonstrated in FIG. 5, the method according to the current disclosure was superior to the other methods tested. The bed height achieved with the method according to the current disclosure was closer to the ideal bed height than the other methods tested. Additionally, the centrifugation method and GE Kit resulted in bed heights that were at or exceeding the error limit that indicates the bed pack is outside of the acceptable bed height range and would require re-packing.
GE Kit Operator Variability Test and Limit Evaluation To access the operator variability of the currently marketed GE Kit, operators were given incremental instruction and experience on how to use the system and performed measurements from bulk solutions after each increment. FIG. 6 shows the results of the operator variability test. The data shows that the GE kit experiences operator-to-operator variability, variability with the level of familiarity and experience, and variability with the material measured. This also shows that the GE kit does not have sufficient controls to produce consistent results in dynamic manufacturing environments.

Figure 7:
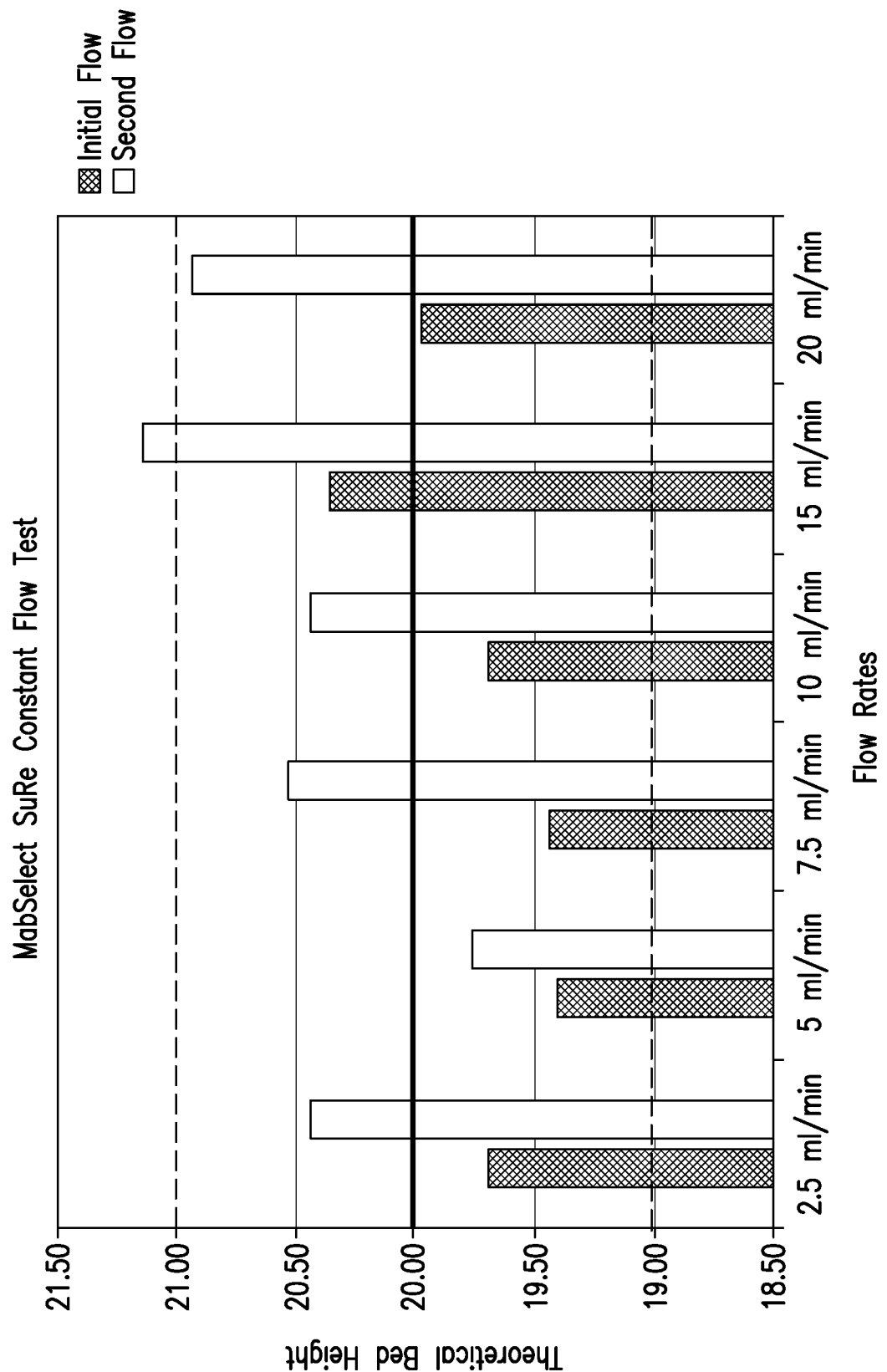
FIG. 7 is a bar graph showing theoretical bed heights of MabSelect SuRe resin with different flow rates that could be experienced using the uncontrolled flow GE Kit. In each set of two bars the solid bar represents the theoretical bed height after the initial flow and the white bar represents the theoretical bed height after the second flow. The X axis represents the flow rate (ml/min) and the Y axis represents the theoretical bed height (cm). The solid horizontal line represents the ideal bed height of the individual resin packs. The dashed horizontal lines represent the bed height limit (±1 cm) before the pack is outside the acceptable bed height range.

To assess the impact of uncontrolled flow used in the currently marketed GE Kit, an experiment was performed that varied flow during sample treatment based on potential operator performance. FIG. 7 shows the result of the experiment in which water was flowed through the column an initial time and a bed height measurement was recorded. Water was then flowed through the column a second time and a second bed height measurement was recorded. FIG. 7 shows that flow outside of the recommended range resulted in potentially unacceptable variation in bed height.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used. Indeed, all ranges disclosed herein are inclusive and combinable. For example, all ranges are inclusive of the endpoints and all intermediate values of the ranges.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A method of determining a slurry concentration, comprising:
    adding a slurry comprising a resin to a first chromatography column;
    pumping a volume of liquid through the first chromatography column at a flow rate;
    controlling the flow rate to match a consolidation rate employed by a second chromatography column to form a consolidated resin in the first chromatography column, wherein the volume of liquid is pumped through the first chromatography column by an automated pump system, wherein the automated pump system is programed to cycle on and off for a predetermined period of time or for multiple periods of time;
    upon completion of the pumping step, measuring a bed height of the consolidated resin in the first chromatography column;
    determining a slurry concentration in the first chromatography column; and
    packing the second chromatography column with the determined slurry concentration in the first chromatography column, wherein the second chromatography column has a packing factor within 5% of an ideal packing factor.

2. The method of claim 1, wherein the liquid is deionized water, distilled water, purified water, a saline solution, or an organic solvent.

3. The method of claim 1, wherein the step of adding the slurry further comprises adding water to the first chromatography column and allowing the slurry to settle for about five minutes to about one hour prior to pumping.

4. The method of claim 1, wherein the second chromatography column comprises a consolidation rate and wherein the flow rate of the first chromatography column is equivalent to the consolidation rate of the second chromatography column.

5. The method of claim 1, wherein the automated pump system comprises a syringe operatively coupled to a pump.

6. The method of claim 1, wherein the packed second chromatography column has a bed height within 1 cm of a target bed height.

7. A method for determining a slurry concentration for a slurry of a chromatography resin during column packing, comprising:
    adding a slurry comprising a resin to a first chromatography column;
    setting an automated pump to run at a constant flow rate for a period of time;
    pumping a volume of liquid through the first chromatography column at the flow rate that matches a consolidation rate employed by a second chromatography column to form a consolidated resin in the first chromatography column, wherein the volume of liquid is pumped through the first chromatography column by the automated pump, wherein the automated pump is programed to cycle on and off for a predetermined period of time or for multiple periods of time;
    upon completion of the pumping step, measuring a bed height of the consolidated resin of the first chromatography column;
    determining a slurry concentration from the measured bed height in the first chromatography column; and
    packing the second chromatography column with the determined slurry concentration in the first chromatography column, wherein the second chromatography column has a packing factor within 5% of an ideal packing factor.

8. The method of claim 7, further comprising, pausing the automated pump to stop the flow of liquid through the first chromatography column and allowing the resin to settle, and restarting the pump to flow liquid through the first chromatography column before completion of the pumping step.

9. The method of claim 8, wherein the pumping is paused for more than one time period.

10. The method of claim 8, wherein the pumping is paused for a time period of 1 to 60 minutes.

11. The method of claim 7, wherein the step of setting the automated pump further comprises providing a flow rate based on which type of resin is utilized in the slurry and the consolidation rate employed by the second chromatography column.

12. The method of claim 11, wherein the flow rate is within a range of about 20 cm/hr to about 1500 cm/hr.

13. The method of claim 7, further comprising mixing the slurry prior to adding the slurry to the first chromatography column.

14. The method of claim 7, wherein the liquid is deionized water, distilled water, purified water, a saline solution, or an organic solvent.

15. The method of claim 7, wherein the packed second chromatography column has a bed height within 1 cm of a target bed height.

16. A method for determining a slurry concentration for a slurry of a chromatography resin during a column packing, comprising:
providing a slurry comprising a resin;
mixing the slurry to uniformly distribute the resin;
adding the slurry to a first chromatography column;
providing an automated pump system comprising a pump having a controller and, wherein the automated pump system is configured to pump a volume of water through the first chromatography column and the controller is configured to control a flow rate of the volume of water to match a consolidation rate employed by a second chromatography column, wherein the flow of the volume of water will pack the resin in the first chromatography column;
pumping the volume of water through the first chromatography column at a constant flow rate to form a consolidated resin, wherein the automated syringe pump system is programed to cycle on and off for a predetermined period of time or for multiple periods of time;
upon completion of the pumping step, measuring a bed height of the consolidated resin of the first chromatography column;
determining a slurry concentration from the measured bed height of the first chromatography column;
inputting the determined slurry concentration into the automated pump system;
and packing the resin in the second chromatography column using the determined slurry concentration in the first chromatography column, wherein the second chromatography column has a packing factor within 5% of an ideal packing factor.

17. The method of claim 16, wherein the flow rate is within a range of about 30 cm/hr to about 60 cm/hr.

18. The method of claim 16, wherein the second chromatography column comprises a consolidation rate and the flow rate of the first chromatography column is equivalent to the consolidation rate of the second chromatography column.

19. The method of claim 16, wherein the packed second chromatography column has a bed height within 1 cm of a target bed height.

* * * * *